United States Patent Office 3,381,135
Patented Apr. 30, 1968

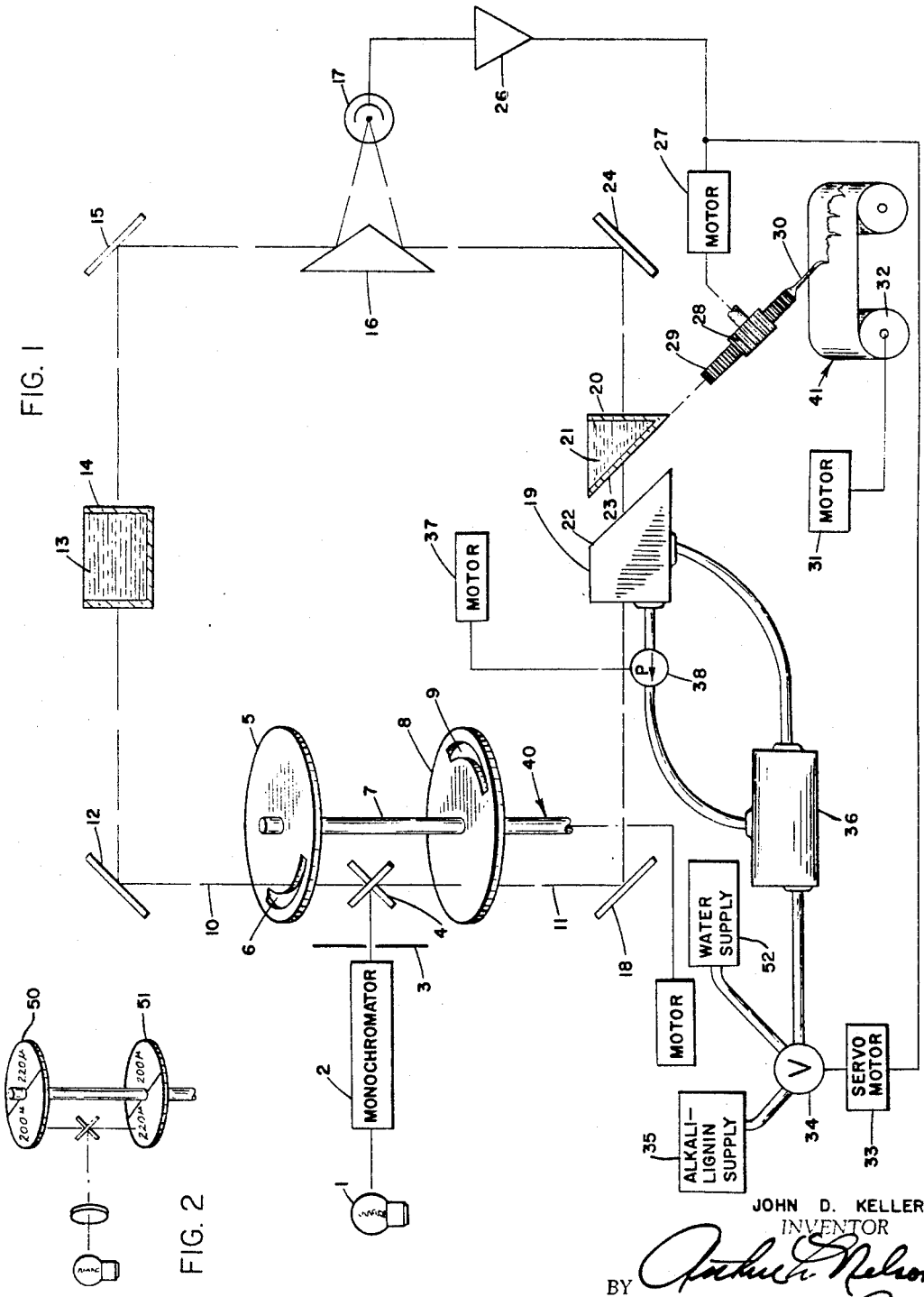

3,381,135
DENSITY MEASURING SYSTEM HAVING OPTICAL WEDGE TO VARY LENGTH OF LIGHT PATH
John D. Keller, Greece, N.Y., assignor to Bausch & Lomb Incorporated, Rochester, N.Y., a corporation of New York
Filed July 1, 1964, Ser. No. 379,641
7 Claims. (Cl. 250—218)

This invention relates to a density measuring system and more particularly to a spectrophotometer for measuring concentration of a material in a liquid.

The papermaking industry requires a means of breaking down wood pulp to form acetates which are used in the manufacture of paper. The wood pulping liquors contain a predetermined concentration of alkali-lignin. The liquors cause the wood pulp to dissolve and form a material which is workable and can subsequently be rolled into sheets of paper. It is necessary that the concentration of the alkali-lignin be maintained constant to make a uniform consistency of the paper manufactured.

Accordingly this invention provides an optical means whereby the concentration of alkali-lignin in the wood pulping liquors is accurately controlled. The output of the optical measuring device may be used to record the concentration and also control the rate of addition of alkali-lignin as the material is used in the process of wood pulping. Although the papermaking process is a specific example of a use for this invention, its use may be extended to any field where the concentration in a liquid is controlled by measuring absorbance.

It is an object of this invention to provide a ratio measuring spectrophotometer indicating absorbance in a liquid to control the concentration of a material in the liquid.

It is another object of this invention to provide a liquid wedge of known concentration of material in a double beam spectrophotometer for measuring the concentration of material in a liquid under observation.

It is a further object of this invention to provide a double beam spectrophotometer having a control responsive to absorbance of a test liquid for regulating the rate of addition of the material varying the absorbance in the liquid.

The objects of this invention are accomplished by providing a double beam spectrophotometer utilizing preferably an ultraviolet source of radiation of a relatively narrow band width of wavelengths to test the absorbance of a solution. The beam of light from the source of radiation is split in two beams, a reference sample of known concentration of material in a liquid is placed in the path of the first beam of light, and the second beam is caused to pass through a wedge of known concentration of material in a liquid which can be moved to cause the path length of light through the wedge to vary. The second beam of light also passes through a liquid of unknown concentration of material which is under test and used for manufacturing. The output from the spectrophotometer is used to control the absorbance of the liquid under test to thereby maintain a predetermined necessary concentration of a material in the liquid under test.

A preferred embodiment of this invention is described in the subsequent paragraphs and illustrated in the attached drawings.

FIG. 1 illustrates a double beam spectrophotometer measuring the absorbance of an unknown liquid and has suitable readout means.

FIG. 2 illustrates the filter arrangement for modulating the light beams.

Referring to the drawings the source of radiation 1 is preferably an ultraviolet source of radiation which radiates into the monochromator 2. A monochromator is used primarily to eliminate interfering bands. A monochromator of high resolution is not necessary for the purpose used in this application. It is suggested that two rotating disc filters might be used, one of which transmits radiation of 200 millimicrons wavelength and higher and then a second filter which transmits 220 millimicrons wavelength and higher. If these filters are introduced alternately into the beam, an analytical wavelength range of 200–220 millimicrons can be produced. FIG. 2 illustrates the means of controlling the analytical wavelength through use of alternating filters. The disc filters 50 and 51 would replace discs 5 and 8 in FIG. 1 and the monochromator might be eliminated.

The output of a monochromator 2 in FIG. 1 is passed through a slit 3 and is directed on the beam splitter 4. The beam splitter 4 splits the radiation into two beams at right angles. The reference beam 10 passes through the disc 5 having a slot 6 which is rotated by a common shaft 7 which also rotates the disc 8 having the slot 9. The slot 9 in the disc 8 is 180° out of phase with the slot 6 on disc 5. The light beams 10 and 11 are chopped alternately at a 180° phase differential.

The reference light beam 10 is reflected by the mirror 12 and is caused to pass through a reference sample 13 in the container 14. The reference beam 10 is then reflected by the mirror 15 and the prism 16 to the photosensor 17 which generates a signal responsive to the light pulses in the reference beam 10.

The test beam 11 chopped by the disc 8 is reflected by the mirror 18 and passes through a transparent container 19 which contains the liquid of unknown concentration which is under test. The light emergent side of the container 19 is beveled and parallel with the entrant side of the wedge container 20 containing a fluid 21 of known concentration which is identical with the reference sample 13. The inclined surfaces 22 and 23 prevent any net refraction of the light after it passes through the container 19 and 20. The absorbance index of all liquids in the containers are the same for a given analytical wavelength but the container 19 varies in the degree of concentration and accordingly, absorbance. The container 20 is movable in the direction of a line parallel to the inclined surface 23 of the container 20, to keep the airspace between 22 and 23 constant thereby preventing the beam from shifting as the wedge is moved. Shifting of the beam is considerable since this would cause a change in the measuring geometry. The test beam 11 subsequent to emerging from the wedge container 20 is reflected by the mirror 24 and the prism 16 and impinges upon the photosensor 17. The photosensor 17 generates alternate electrical signals responsive to the pulses of light from the reference beam 10 and the test beam 11. These alternate electrical signals are amplified in the amplifier 26 and fed into the motor 27.

The readout system as indicated includes the motor 27 driving a gear 28 reciprocating the track 29 which is connected to the wedge container 20. The unbalance in the electrical signals generated by the reference and sample beams causes a rotation or counterrotation of the motor 27 to equalize the light pulses heights in the output of the spectrophotometer. If the test beam is of greater intensity than the reference beam of the photosensor 17 then the wedge 20 is caused to move in a direction whereby the light path length through the wedge 20 is greater and thereby causing greater absorption on the test beam. The reverse situation is true where the test beam is of lesser intensity than the reference light beam causing the light path through the wedge 20 to become shorter and permitting more light to be transmitted through the wedge 20.

The track 29 is connected to a stylus 30 which records directly the absorbance in the sample container 19. Absorbance is recorded on the recording device. Absorbance may be transformed into transmittance by the well known transformation Beer's law. The motor 31 drives the drum 32 to provide movement on the independent variable of the recording mechanism.

The amplifier 26 is also connected to a servomotor 33 which is connected to a control valve 34 in a conduit means intermediate the alkali-lignin supply 35, the water supply 52, and the tank of wood pulping liquors 36. With a decrease in concentration of alkali-lignin in the solution the servomotor will automatically open the valve 34 to add alkali-lignin and increase the concentration in the solution. This increase will be sensed by the optical system and when the concentration is built up to the desired level the valve 34 automatically shuts off. With an over-concentration of alkali-lignin in the liquors the servomotor will open the valve 34 and allow water from the supply 52 to be added to the tank 36 and thereby reduce the degree of concentration. A suitable overflow arrangement would be provided if necessary when water is added.

A motor 37 drives the pump 38 to constantly circulate the solution through the tank 36 and the container 19 maintaining thorough distribution of the alkali-lignin in the solution.

The operation of the device will be described in the following paragraphs. The source of radiation 1 is directed into the monochromator 2 to produce a narrow band width of radiation emerging from the slit 3. The beam splitter 4 splits the beam into a reference beam 10 and a test beam 11. Each beam is alternately chopped by the chopper 40. The reference beam 10 passes through the reference solution 13 and is directed on the photosensor 17. The sample beam 11 is chopped at 180° phase differential from the reference beam 10 and passes through the sample container 19 and the wedge container 20. The beam is then directed onto the photosensor 17.

The photosensor 17 generates alternate electrical signals responsive to alternate impulses of light from the reference beam 10 and the sample beam 11. These alternate electrical signals are then applied to the amplifier 26. The signals are then applied to the motor 27 and the servomotor 33. The motor 27 drives the y axis of a recording device 41 and also simultaneously the wedge 20 in the optical system of the test beam. The motor 27 equalizes the output intensities of the reference beam and the sample beam and produces a balanced output of the photosensor 17 when the motor has driven the wedge 2 in an optical null position. This mechanism drives the stylus 30 to record absorbance of the test beam in the test chamber of container 22.

The signal from the amplifier 26 is also applied to a servomotor 33 which controls the valve 34 to permit addition of alkali-lignin from the supply 35, or water from the supply 52 when necessary to the tank 36 to thereby maintain a predetermined relatively constant concentration in tank 36. In this manner the absorbance of the signal in the tank 36 is sensed to maintain concentration constant.

The preferred embodiment of this invention has been described and it is understood that other embodiments might be devised which would fall within the scope of this invention which is defined by the attached claims.

I claim:

1. A double beam spectrophotometer comprising means producing a reference radiation beam, means producing a test radiation beam, means placing a material of known concentration in said reference beam, means placing a test sample in said test beam and adjustably placing an optical wedge of the material of known concentration in said test beam, a photosensor sensing and generating electrical signals responsive to the intensity of said reference beam and said test beam subsequent to passing through said materials, motor means connected to said wedge and receiving said electrical signals to adjustably move said wedge to an optical null position in said test beam.

2. A double beam spectrophotometer comprising means producing a reference radiation beam, means producing a test radiation beam, means placing a material of known concentration in said reference beam, means forming a test chamber for placing a test sample of unknown concentration in said test beam and adjustably placing an optical wedge of said material of known concentration in said test beam, a tank including conduit means connected to said test chamber containing said test sample and to a supply of material producing absorbance in the analytical wavelength range, photosensor means sensing said radiation beams and generating electrical signals responsive thereto, motor means receiving said electrical signals from said photosensor drivingly connected to said optical wedge to adjustably move said wedge to an optical null position and adjustably feed material from said supply to said tank to thereby maintain a substantially constant concentration in said tank.

3. A double beam spectrophotometer comprising means producing a reference radiation beam, means producing a test radiation beam, means placing a material of known absorbance in said reference beam, means forming a test chamber for placing a test material in said test beam, means adjustably placing an optical wedge of said material of the known absorbance in said test beam, a photosensor means sensing and generating electrical signals responsive to the intensity of the radiation from said reference beam and said test beam, motor means drivingly connected to said wedge to adjustably move said wedge to an optical null position in said test beam and means connected to said motor to record the absorbance in said test sample.

4. A spectrophotometer comprising means generating a first series of radiation pulses, means introducing a reference material of known concentration in the path of said reference pulses, means generating a second series of radiation pulses, means forming a test chamber for placing a test sample in the path of said second series of radiation pulses, means placing an optical wedge containing said material of known concentration in the path of said second series of radiation pulses, a photosensor receiving said first and second series of radiation pulses and generating electrical signals responsive thereto, motor means connected to said wedge receiving said electrical signals from said photosensor and driving said wedge to an optical and null position for the radiation pulses and thereby indicating a measure of absorbance in said test material.

5. A spectrophotometer comprising means producing a first series of radiation pulses, means placing a liquid of known concentration in the path of the first series of radiation pulses, means producing a second series of radiation pulses, means forming a sample chamber for receiving a liquid of unknown concentration and positioning said material in the path of said second series of radiation pulses, a wedge containing said liquid of known concentration positioned in the path of said second series of radiation pulses, a photosensor means receiving said first and said second of radiation pulses and generating the electrical signals responsive to the intensity of said radiation pulses, motor means connected to said photosensor drivingly connected to said wedge to drive said wedge to an optical null position to equalize the output intensity of the radiation from said test series and said reference series of pulses, a tank including conduit means for circulating liquid through said tank and said test chamber, a source of supply of material varying the absorbance of said liquid of unknown concentration having valve means in a conduit means connected to said tank for regulating the flow of said material into said tank responsive to the absorbance of the material in said test chamber to thereby regulate said test liquid to a substantially constant concentration.

6. Photoelectric apparatus for determining the concentration of a known constituent in a test solution comprising a sample chamber adapted to receive said test solution, a reference chamber adapted to receive a solution having a known concentration of said constituent, a tapered container having a radiation transparent path therethrough adapted to receive a solution having a known concentration of said constituent, photoelectric means for generating an electrical signal in response to radiation applied thereto, means for directing a beam of radiation through said reference chamber to said photoelectric means, means for directing a beam of radiation through said sample chamber to said photoelectric means, means for alternatingly interrupting said beams of radiation, means movably mounting said tapered container in one of said beams so that said beam passes through said transparent path and the solution received by said container, and servo means coupled between said tapered container and said photoelectric means for moving said tapered container in response to the signal generated by the photoelectric means to a null position.

7. Apparatus for automatically controlling the concentration of a constituent of a solution in a container comprising a source of said constituent, a source of a diluent, valve means coupling said sources to said container, a test chamber, means for transmitting a portion of said solution from said container into said test chamber, a reference chamber adapted to receive a standard solution including a known concentration of said constituent, a wedge shaped container including a radiation transparent path therethrough adapted to receive said standard solution, radiation sensitive means for generating an electrical signal in response to radiation applied thereto, means for directing a beam of radiation through said test chamber to said radiation sensitive means, means for directing a beam of radiation through said reference chamber to said radiation sensitive means, means for alternatingly interrupting said beams of radiation, means for movably mounting said wedge shaped container in one of said beams so that said beam passes through said wedge and said standard solution therein, servo means coupled between said radiation sensitive means and said wedge shaped container for moving said wedge shaped container to a null position, and control means coupled between said servo means and said valve means for automatically controlling the concentration of said constituent in said container.

References Cited
UNITED STATES PATENTS

| | | | |
|---|---|---|---|
| 2,066,934 | 1/1937 | Gulliksen | 250—218 |
| 3,071,037 | 1/1963 | Brumley | 250—218 |
| 3,257,562 | 6/1966 | Erdman et al. | 88—(145) |

RALPH G. NILSON, *Primary Examiner.*

M. ABRAMSON, *Assistant Examiner.*